United States Patent
Cun et al.

(10) Patent No.: US 11,604,072 B2
(45) Date of Patent: Mar. 14, 2023

(54) METHOD AND SYSTEM FOR SYNCHRONIZING START OF GROUP RIDE RENTALS

(71) Applicant: Honda Motor Co., Ltd., Tokyo (JP)

(72) Inventors: David Cun, Fountain Valley, CA (US); Matthew Staal, Torrance, CA (US); Peter Wendt, Redondo Beach, CA (US)

(73) Assignee: Honda Motor Co., Ltd., Tokyo (JP)

(*) Notice: Subject to any disclaimer, the term of this patent is extended or adjusted under 35 U.S.C. 154(b) by 421 days.

(21) Appl. No.: 16/836,802

(22) Filed: Mar. 31, 2020

(65) Prior Publication Data
US 2021/0302177 A1    Sep. 30, 2021

(51) Int. Cl.
*G06Q 50/30* (2012.01)
*G06Q 10/02* (2012.01)
*G01C 21/34* (2006.01)
*H04W 4/08* (2009.01)
*G06Q 30/0645* (2023.01)
*G06Q 20/10* (2012.01)

(52) U.S. Cl.
CPC ......... *G01C 21/3438* (2013.01); *G06Q 10/02* (2013.01); *G06Q 20/102* (2013.01); *G06Q 30/0645* (2013.01); *G06Q 50/30* (2013.01); *H04W 4/08* (2013.01)

(58) Field of Classification Search
CPC ... G01C 21/3438; H04W 4/08; G06Q 20/102; G06Q 30/0645; G06Q 50/30; G06Q 10/02; G08G 1/20–22
See application file for complete search history.

(56) References Cited

U.S. PATENT DOCUMENTS

| | | | |
|---|---|---|---|
| 2016/0148123 A1* | 5/2016 | Paleja | G06Q 10/02 705/5 |
| 2017/0039668 A1 | 2/2017 | Luke et al. | |
| 2019/0311630 A1 | 10/2019 | Vanderzanden et al. | |
| 2019/0324446 A1 | 10/2019 | Vanderzanden et al. | |
| 2020/0298882 A1* | 9/2020 | Kobayashi | B60W 30/16 |
| 2021/0031848 A1* | 2/2021 | Du | B60R 25/32 |
| 2021/0162949 A1* | 6/2021 | Arakawa | E05B 49/00 |
| 2021/0192663 A1* | 6/2021 | Spielman | G06Q 50/30 |
| 2022/0003561 A1* | 1/2022 | Shoval | G01C 21/362 |

OTHER PUBLICATIONS

Introducing Group Ride: Lime's Newest Scooter Feature Rolls Out In Over 20 Cities, Jul. 10, 2019, li.me, https://www.li.me/blog/group-ride-lime-newest-scooter-feature-rolls-out-over-20-cities#:~:text=Introducing%20Group%20Ride%2C%20a%20new,Lime%20app%20to%20get%20started. (Year: 2019).*

* cited by examiner

*Primary Examiner* — Resha Desai
*Assistant Examiner* — Michelle E Carey
(74) *Attorney, Agent, or Firm* — Plumsea Law Group, LLC

(57) ABSTRACT

A method and system for synchronizing the start of group ride rentals of electric transport devices is described. In one embodiment, a method for initiating a group ride for a plurality of users of electric transport devices includes receiving a request from a first user of an electric transport device to initiate a group ride from a first location to a second location. The method also includes adding one or more additional users to the group ride. Each user is associated with a separate billing account with a service provider for the electric transport devices. The method further includes delaying a start of billing for each user included in the group ride by the service provider until each user has located an electric transport device.

20 Claims, 10 Drawing Sheets

METHOD AND SYSTEM FOR SYNCHRONIZING START OF GROUP RIDE RENTALS

BACKGROUND

This disclosure relates generally to vehicles, and in particular to a system and method for synchronizing the start of group ride rentals of electric transport devices.

With rising prices of gasoline and automobiles, many people may turn to other more cost efficient modes of transportation such as, for example, mopeds, bicycles, scooters and, more recently, electric personal transport devices such as stand-up electric scooters or kick scooters. These personal transport devices may be particularly popular for shorter trips in a city environment due to their compact size, ease of use, mobility, and the fact that they may be folded as needed for ease of portability. They may also be useful for covering the first mile or last mile of a trip which is the link between a user's origin or destination and another transportation means, hub or mass transit network.

Sometimes, there may be multiple users of electric personal transport devices who want a group rental so that they may ride together. Conventional methods for group rentals may require each user or participant to separately activate their scooter or other device. Often, these scooters may be at different locations and, as a result, there is a time delay for the users or participants in the group to find their respective scooters. Additionally, if someone activated their scooter in advance of the other users, that person may need to wait for the other users to activate their scooters before the group ride may begin. Thus, the scooter rental would end up costing more for the person(s) who activated their scooters before the rest of the users or participants.

Accordingly, there is a need in the art for an improved system and method for synchronizing the start of group ride rentals of electric transport devices.

SUMMARY

In one aspect, a method for initiating a group ride for a plurality of users of electric transport devices is provided. The method may include receiving a request from a first user of an electric transport device to initiate the group ride from a first location to a second location. The method may also include adding one or more additional users to the group ride. Each user may be associated with a separate billing account with a service provider for the electric transport devices. The method may further include delaying a start of billing for each user included in the group ride by the service provider until each user has located an electric transport device.

In another aspect, a method for synchronizing billing for a group ride for a plurality of users of electric transport devices is provided. The method may include receiving a request to initiate a group ride of electric transport devices from a first location to a second location. The group ride may include a plurality of users, where each user is associated with a separate billing account with a service provider for the electric transport devices. The method may also include delaying a start of billing for each user included in the group ride by the service provider until each user has located an electric transport device. The method further may include synchronizing billing for each user included in the group ride during the group ride from the first location to the second location.

In another aspect, a system for synchronizing billing for a group ride for a plurality of users of electric transport devices is provided. The system may include a plurality of electric transport devices, a service provider for the plurality of electric transport devices, and a plurality of users. Each user may have a separate billing account with the service provider for the electric transport devices. The service provider may include at least one processor configured to execute instructions to receive a request to initiate a group ride of electric transport devices from a first location to a second location, the group ride including at least two users of the plurality of users. The processor may also be configured to delay a start of billing for each user included in the group ride until each user has located an electric transport device. The processor may be further configured to synchronize billing for each user included in the group ride during the group ride from the first location to the second location.

Other systems, methods, features and advantages of the disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The disclosure may be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

Methods and systems for synchronizing the start of group ride rentals of electric transport devices are described herein. The techniques of the present embodiments may be used to allow users of electric transport devices to initiate a group rental that delays billing for the rental until all users in the group have located an electric transport device.

The example embodiments are described herein with reference to an electric transport device in the form of an electric scooter. As used herein, an electric scooter is a term used mainly to describe a stand-up kick scooter that is electrically powered. For example, this is a type of personal transport device that is gaining ridership in many locations. The principles of the example embodiments described herein may be applied to electric scooters or other types of electric transport devices, such as bicycles, unicycles, mopeds, skateboards, kickboards, wheelchairs, personal transporters, or the like.

The present embodiments allow for multiple users to rent electric scooters to start a group ride together to a destination. As will be described herein, the features of the present embodiments provide an option to start the billing process for each user only when everyone in the group has located an electric scooter. As the scooters may be located in different areas and may hard to find, the example embodiments allow each of the users in the group time to locate their scooter before billing for the group ride begins. With this arrangement, synchronized billing for each user of the group rental may be provided.

Figure 1:
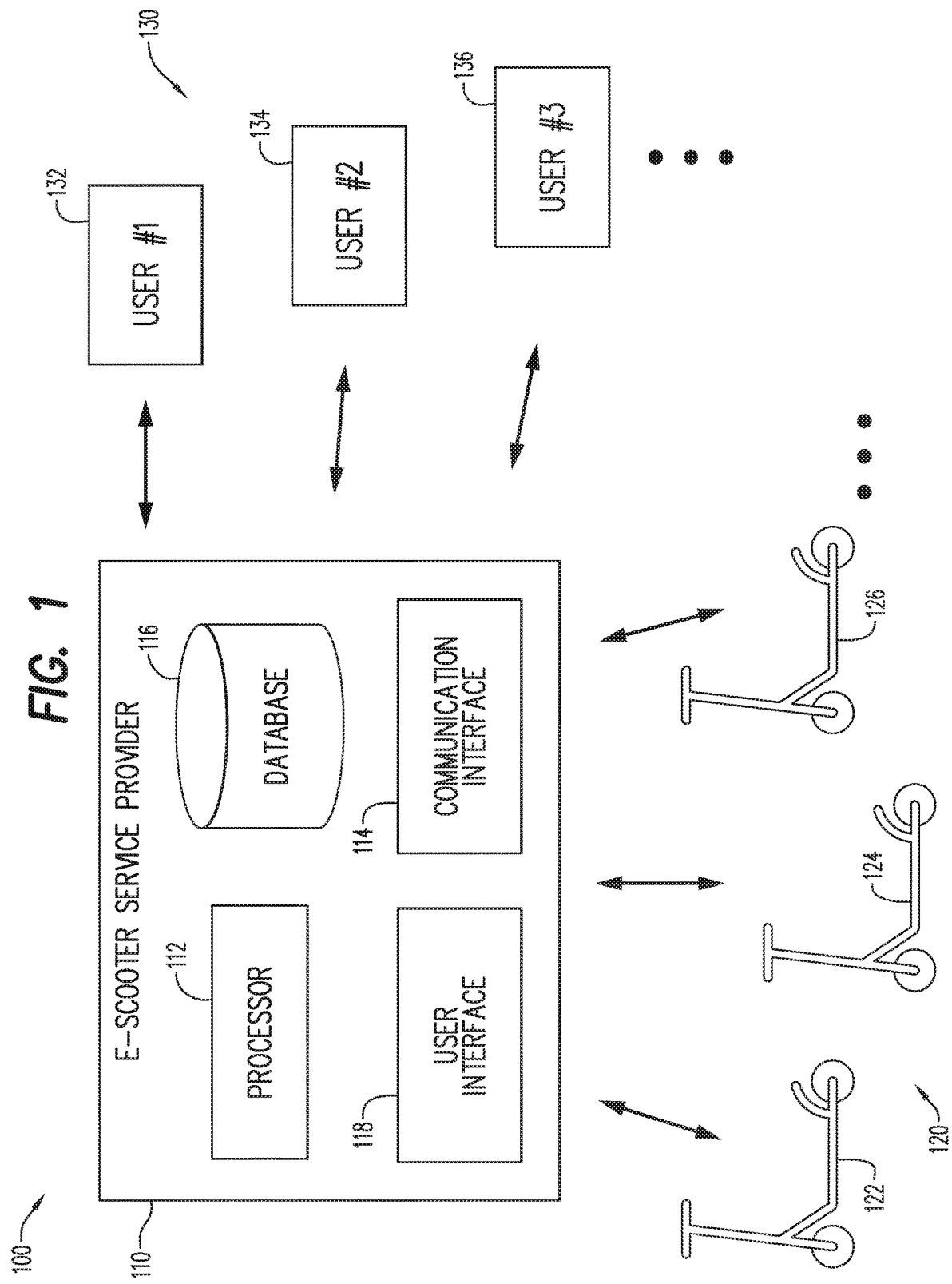
FIG. 1 is a block diagram of an example embodiment of an electric transport device service provider system in accordance with aspects of the present disclosure.

Referring now to FIG. 1, a block diagram of a system 100 for synchronizing the start of group ride rentals of electric transport devices is shown. In an example embodiment, system 100 includes an electric scooter or "e-scooters" service provider 110 (also referred to herein as "service provider 110") for providing rentals of electric transport devices to users. In an example embodiment, service provider 110 may rent one or more different types of electric transport devices, such as electric scooters, to users for personal transportation from a location to a destination. In the example embodiments, service provider 110 provides e-scooter rentals to users, however, it should be understood that service provider 110 may offer any type of electric transport device for rental to users.

In this embodiment, service provider 110 includes at least a processor 112 that is in communication with a communication interface 114, a database 116, and a user interface 118. In some embodiments, processor 112 may be a dedicated central processing unit (CPU) configured to implement the techniques described herein. In other embodiments, processor 112 may be any computer or computing system, including, but not limited to configurations having multiple processors, one or more servers, and/or a distributed computing system that is located remotely from service provider 110.

In an example embodiment, system 100 also includes a plurality of electric transport devices 120. In this embodiment, plurality of electric transport devices 120 are in the form of electric scooters ("e-scooters") and include at least a first e-scooter 122, a second e-scooter 124, and a third e-scooter 126. As shown in FIG. 1, three representative e-scooters are shown for the purposes of description. However, in some embodiments, system 100 may include any number of e-scooters and/or other types of electric transport devices. For example, in various embodiments, system 100 may include hundreds or even thousands of electric transport devices located across a given geographic area.

For example, plurality of electric transport devices 120 may be located at various locations throughout a geographic area where there is a high density of users of electric transport devices, such as cities and other urban type environments. As shown in FIG. 1, system 100 may include a plurality of users 130. In this embodiment, plurality of users 130 includes at least a first user 132, a second user 134, and a third user 136. In other embodiments, system 100 may include any number of users. In an example embodiment, service provider 110 may include components embodied in hardware, software, or a combination thereof that are configured to implement the techniques described herein for synchronizing the start of group ride rentals of electric transport devices for users.

In an example embodiment, communication interface 114 is configured to enable various wireless network communications, such as via code division multiple access (CDMA) and/or global system for mobile communications (GSM) networks, as well as one or more of Bluetooth, WiFi, and/or other wireless communication technologies, including short-range wireless, ultra-wideband, or near-field communication technologies. In this embodiment, communication interface 114 is configured to allow service provider 110 to communicate with other components of system 100, including one or more of plurality of electric transport devices 120 and/or a central monitoring system (not shown). For example, in one embodiment, communication interface 114 may be a wireless transceiver that transmits and/or receives signals (e.g., commands, messages, information, etc.) to and/or from one or more of plurality of electric transport devices 120 and one or more of plurality of users 130, as well as the central monitoring system.

In some embodiments, service provider 110 may also include database 116 that includes information associated with one or more of plurality of users 130 and/or plurality of electric transport devices 120. For example, database 116 may include user or account information, such as usernames and passwords, billing information, etc. Database 116 may also include information associated with the one or more plurality of electric transport devices 120 in the geographic area associated service provider 110. For example, database 116 may include identification information about each of plurality of electric transport devices 120, including first e-scooter 122, second e-scooter 124, and/or third e-scooter 126, such as a serial number or identifier, as well as other information, including, but not limited to state of charge or battery status, usage data (e.g., miles, hours of service, etc.), device type or model, or any other information that may be used by service provider 110.

In this embodiment, service provider 110 also includes user interface 118 that is configured to allow a user, for example, one or more of plurality of users 130, including first user 132, second user 134, and/or third user 136, to interact with service provider 110. In one embodiment, user interface 118 may be configured to interact with a user through a mobile device, such as a smart phone or tablet, using short-range communication technologies, for example, Bluetooth®. For example, a user may interact with user interface 118 of service provider 110 through an application (also referred to as an "app") on the user's mobile device.

In an exemplary embodiment, the electric transport devices or e-scooters (e.g., plurality of electric transport devices 120) may include a dock or other apparatus for receiving a mobile device, such as a smart phone or other type of portable computing device, associated with a user of the e-scooter. With an application installed on the user's mobile device, the mobile device may function as a display screen for the electric transport device or e-scooter and provides a communication interface to an onboard controller or processor of the electric transport device (if present), as well as allowing communication with communication interface 114 and/or user interface 118 of service provider 110.

As described above, communication between the user's mobile device and the onboard controller or processor of the e-scooter, as well as with communication interface 114 and/or user interface 118, may be accomplished by a variety of ways such as Bluetooth® or other types of short-range wireless or near-field communication protocols. The display screen of the mobile device may provide information to the user of the electric transport device regarding, for example, battery life, status of lighting units, distance traveled, speed, navigation information, hazard information and roadway infrastructure signals and readings. The application on the mobile device may also monitor and/or control some of the operating systems of the electric transport device. For example, information associated with braking, speed, location, heading, turn status, etc. may be monitored and/or controlled via the application on the mobile device.

Figure 2:
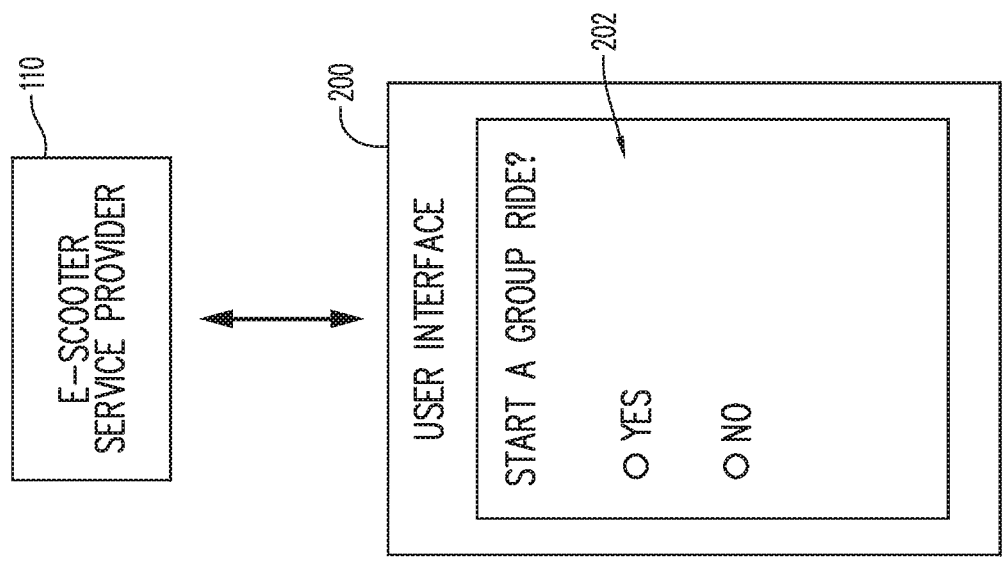
FIG. 2 is a representative view of an illustrative user interface for synchronizing the start of group ride rentals of electric transport devices in accordance with aspects of the present disclosure.

Referring now to FIG. 2, a representative view of a user interface 200 for synchronizing the start of group ride rentals of electric transport devices is shown. As described above, in some embodiments, a user (e.g., one or more of plurality of users 130) may interact with user interface 118 of service provider 110, for example, through an application or website, to rent one or more of plurality of electric transport devices 120. In an example embodiment, user interface 200 may be provided on the user-side, for example, through a user's mobile device, such as mobile telephone, tablet, computer, or other device, to allow the user to initiate a group ride rental with service provider 110 for multiple users of plurality of electric transport devices 120.

In this embodiment, user interface 200 includes an option 202 for the user to start or initiate a group ride that includes multiple users of plurality of electric transport devices 120. As shown in FIG. 2, a user may initiate the group ride by selecting the "YES" option from user interface 200. For example, a group ride may include two or more users of plurality of electric transport devices 120 leaving from a starting location and heading to at least one common destination. Each of the users participating in the group ride to the common destination are traveling together from the starting location. The techniques described herein allow these users to synchronize their group ride to the destination so that none of the users participating in the group ride is charged for their rental before the other users have located and readied their electric transport devices for the ride. With this arrangement, each user participating in the group ride will have their individual billing for the rental of their respective electric transport device (e.g., e-scooter) with service provider 110 synchronized with the other users so that everyone pays substantially the same amount for the group trip to the common destination.

Figure 3:
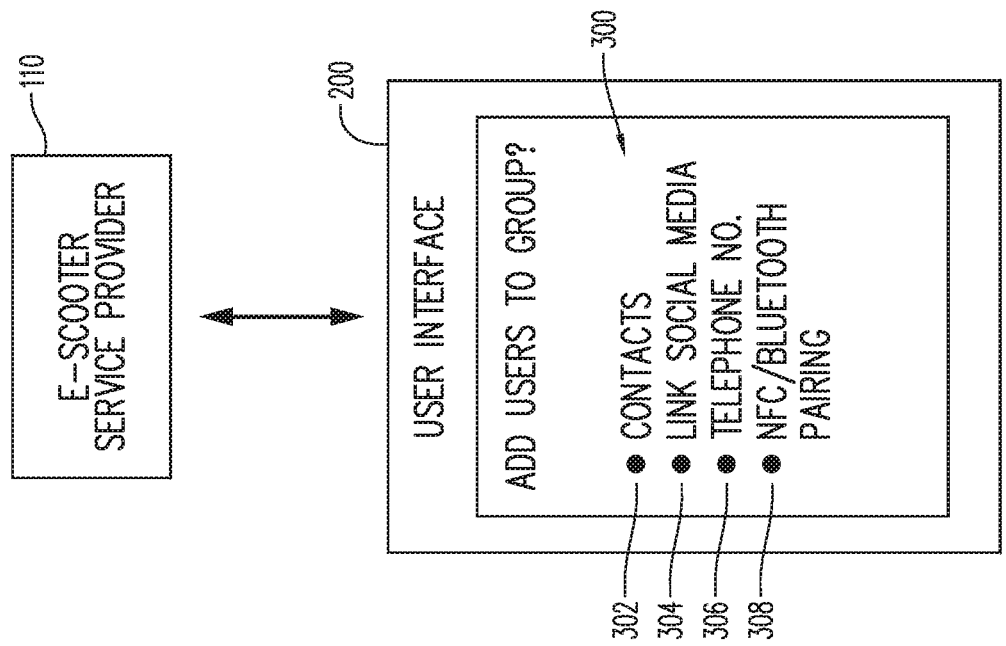
FIG. 3 is a representative view of an illustrative user interface for adding users to a group ride rental in accordance with aspects of the present disclosure.

Referring now to FIG. 3, a representative view of user interface 200 for adding users to a group ride rental is shown. In this embodiment, after a user has initiated a group ride (e.g., through option 202 on user interface 200 shown in FIG. 2 above), the user may add one or more users to the group ride rental through user interface 200. In some embodiments, the user initiating the group ride rental (also referred to as "group leader") may add the additional users to the group ride through various mechanisms. For example, as shown in FIG. 3, user interface 200 may include an option 300 to add users to the group ride. The users added to the group ride rental through option 300 of user interface 200 of the user serving as the group leader may be obtained from different sources.

In this embodiment, the additional users may be added from one or more of contacts 302 (e.g., obtained from a contacts list associated with the group leader's mobile device), social media 304 (e.g., linked from one or more social media applications or websites), telephone number 306 (e.g., the group leader may add a user by their telephone number used for billing through service provider 110), and/or near-field communication (NFC)/Bluetooth® pairing 308 (e.g., using a short-range communication protocol that allows the group leader to add users to the group ride). In other embodiments, additional users may be added to the group ride using other mechanisms, such as by user names, quick response (QR)-codes or other scanned barcodes or links, etc. With this arrangement, the user initiating the group ride rental with service provider 110 (e.g., the group leader) may add additional users using a variety of different mechanisms and/or applications.

According to the techniques described herein, while the group ride may be initiated by a single user (i.e., the group leader), each user participating in the group ride rental has an existing user account with service provider 110 for the purposes of billing the rental for the user's electric transport device or e-scooter used for the group ride rental. In some embodiments, each participating user added to the group ride (e.g., via option 300 on user interface 200, shown in FIG. 3), may receive a notification or message from service provider 110 requesting confirmation or acceptance by the user to be added to the group ride. For example, each user may also be associated with a mobile device that is in communication with user interface 118 of service provider 110, such as through an application executing on the mobile device. With this arrangement, each user participating in the group ride rental may confirm or accept their addition to the group ride.

Figure 4:
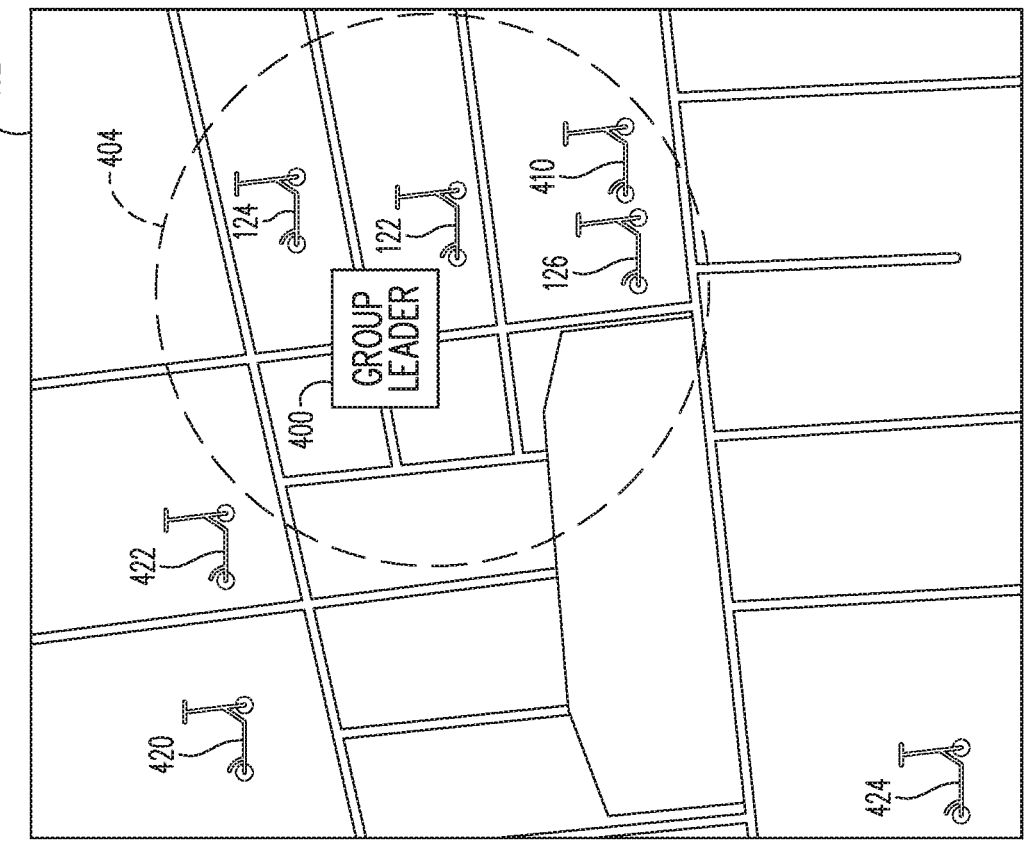
FIG. 4 is a schematic view of an example embodiment of a group leader for a group rental locating electric transport devices for users in accordance with aspects of the present disclosure.

FIG. 4 is a schematic view of an example embodiment of a group leader for a group rental locating electric transport devices for users. As described above, in some embodiments, a user that initiates the group ride rental may be designated as the group leader. For example, a group leader 400 has located his or her electric transport device and has begun a group ride rental for one or more additional users. In this embodiment, group leader 400 may be one user of plurality of users 130, shown in FIG. 1. In accordance with the principles of the example embodiments, once group leader 400 has initiated the group ride, other users that will be joining group leader 400 need to locate and ready their electric transport devices before billing will begin for all users that are participating in the group ride. That is, while group leader 400 may already have his or her electric transport device ready to use, other users may need to locate additional electric transport devices. During this process of locating the additional devices, billing by service provider 110 for the rental of the electric transport device selected by group leader 400 has not yet begun.

In some embodiments, a map 402 of the geographic area in which group leader 400 is located may be displayed on the user's mobile device, for example, through user interface 200 of the application running on the mobile device of group leader 400. In an example embodiment, map 402 may include icons or other indicia to designate the location of one or more electric transport devices within the geographic area shown on map 402. Additionally, in some embodiments, electric transport devices that are available for rental by the other users participating in the group ride initiated by group leader 400 may be displayed on map 402. In an example embodiment, map 402 may include a predetermined area 404 centered around group leader 400 so that the other users may locate the available electric transport devices that are near the current location of group leader 400.

For example, as shown in FIG. 4, predetermined area 404 is approximately a circular area having a radius centered on group leader 400 and extending outward a set distance. The predetermined area 404 may be approximately 2-3 blocks or may be determined using other proximity criteria, such as time (e.g., within a 5-10 minute walk from the location of group leader 400) or distance in miles or kilometers (e.g., ¼ mile or less from the location of group leader 400). Other criteria may also be used in addition to, or alternatively, to show the available electric transport devices that may be rented by other users participating in the group ride. For example, a predetermined amount of battery charge or available travel distance may be used as a criteria. Additionally, in embodiments, where more than one type of electric transport device is available, type or form of electric transport device may be used as a criteria.

In this embodiment, group leader 400 has selected first e-scooter 122 for the group ride and at least three additional electric transport devices are within predetermined area 404 of group leader 400. As shown in FIG. 4, second e-scooter 124, third e-scooter 126, and a fourth e-scooter 410 are within predetermined area 404, while a fifth e-scooter 420, a sixth e-scooter 422, and a seventh e-scooter 424 are located outside of predetermined area 404. In accordance with the example embodiments, before billing for the rental of first e-scooter 122 begins for group leader 400, each of the other users participating in the group ride is allowed to find and ready a respective scooter.

In some embodiments, electric transport devices may be in a locked state prior to rental by a user. In this locked state, the electric motor and/or wheels of the electric transport device may be disabled or prohibited from moving so that the electric transport device is not functional by either powered or manual operation. In an example embodiment, each electric transport device selected by a user of the group ride before all of the users have found their respective electric transport devices may be in a partially unlocked state so as to permit manual operation of the device and free motion of the wheels. However, in this partially unlocked state, the electric motor of the electric transport device would not be activated and/or provided with power until each and every user in the group ride has found their respective electric transport device. Once all users have found and readied their electric transport devices, the group ride rental may begin and a powered state for the electric transport devices may be authorized to allow the electric motor to function according to normal operation.

Figure 5:
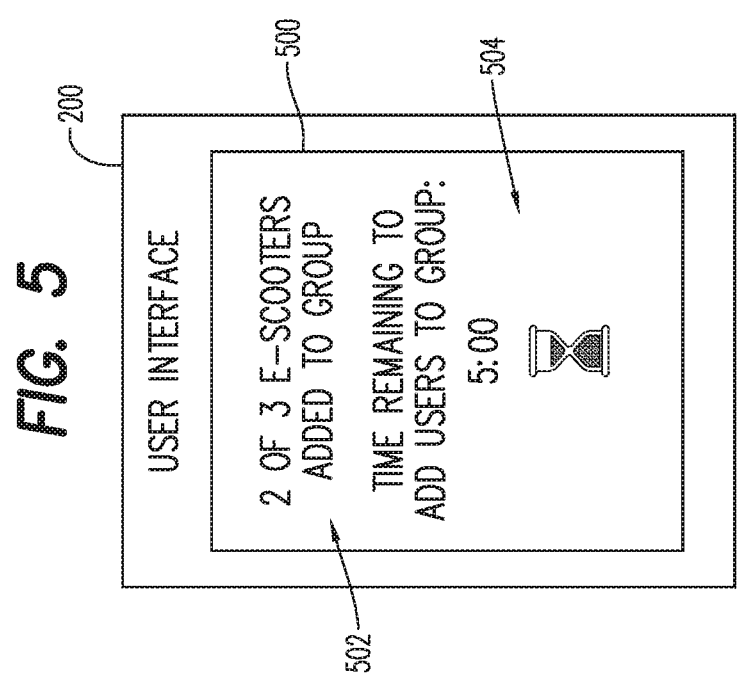
FIG. 5 is a representative view of an illustrative user interface for adding users to a group ride rental in accordance with aspects of the present disclosure.

Referring now to FIG. 5, a representative view of user interface 200 for adding users to a group ride rental is shown. In some embodiments, users participating in the group ride may have a predetermined time limit or period to locate electric transport devices. For example, the predetermined time period may be 5 minutes or may be some other time. In some cases, the predetermined time period may be adjusted based on number of participating users, locations of available electric transport devices, or other criteria. With this arrangement, service provider 110 may be protected from users who are attempting to cheat or abuse the group ride rental option by requiring that the group ride commence within some predetermined period of time, rather than extending for an indefinite amount of time.

In this embodiment, user interface 200 includes a status indicator 500 that shows a user status 502 to indicate the number of total users participating in the group ride, as well as the number of those users that have already located and readied a respective electric transport device. For example, in this embodiment, three users are participating in the group ride and user status 502 of status indicator 500 shown on user interface 200 indicates that two users of the three have already successfully added their electric transport devices (e.g., e-scooters) to the group ride. Additionally, in this embodiment, status indicator 500 also includes a timer 504. Timer 504 displays the amount of time remaining for the additional users participating in the group ride to locate and ready their device. For example, in this embodiment, timer 504 shows a predetermined amount of time, such as five minutes, remaining for additional users to locate their electric transport devices to the group ride. In other embodiments, timer 504 may be extended after each user locates an electric transport device or upon manual reset or other action to indicate that users need more time to locate available devices.

Figure 6:
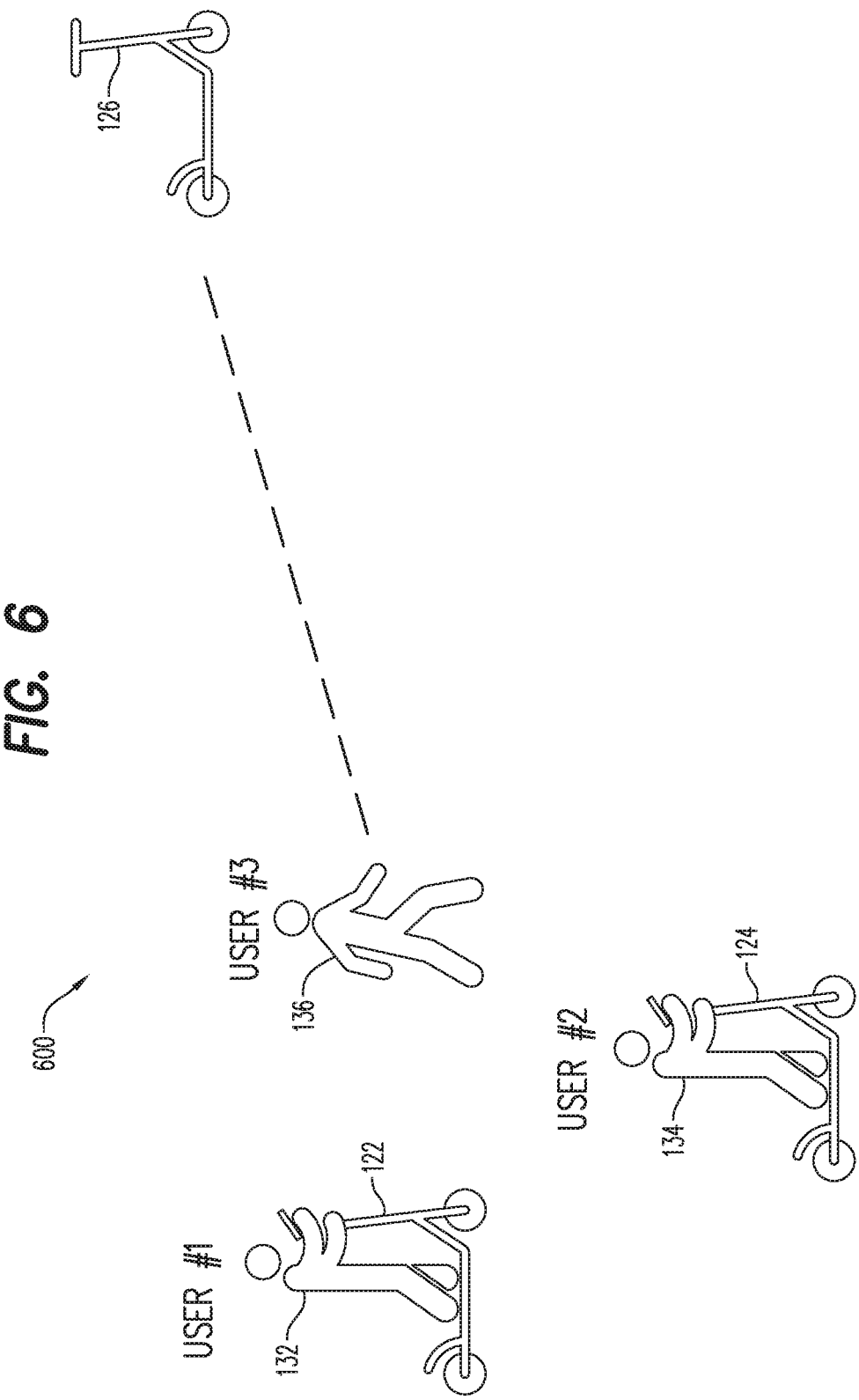
FIG. 6 is a schematic view of an example embodiment of a user of a group ride rental locating an electric transport device in accordance with aspects of the present disclosure.

FIG. 6 is a schematic view of an example embodiment of a user of a group ride rental locating an electric transport device. As described above, in some embodiments, one or more users participating in the group ride rental may need to locate an available electric transport device (e.g., e-scooter) before all of the users may begin the group ride. In this embodiment, an example scenario 600 is illustrated where a group ride has been initiated (e.g., by first user 132 who may be serving as group leader 400) for three users, including first user 132, second user 134, and third user 136. According to scenario 600, first user 132 has located first e-scooter 122 and second user 134 has located second e-scooter 134, however, third user 136 has not yet located an available e-scooter.

According to the example embodiments, until third user 136 locates an available electric transport device, billing for the group ride rental for the other users participating in the group ride will not begin. That is, as shown in FIG. 6, first user 132 will not be billed by service provider 110 for using first e-scooter 122 and second user 134 will not be billed by service provider 110 for using second e-scooter 134 while third user 136 is still looking for his or her electric transport device. Additionally, in some embodiments, while third user 136 is attempting to locate an electric transport device, each of first e-scooter 122 and second e-scooter 134 may be in a partially unlocked state so that first user 132 and second user 134 may use their respective e-scooters in a manual operation, but the electric motors and/or power are not yet enabled until all of the users in the group ride have located and readied their e-scooters.

In scenario 600, therefore, billing by service provider 110 for each of the users participating in the group ride (e.g., first user 132, second user 134, and third user 136) only begins once third user 136 finally locates and readies third e-scooter 126 for use during the group ride. With this arrangement, synchronized billing for each user participating in the group ride rental may be provided by service provider 110. In addition, in some embodiments, service provider 110 may offer a discount on rental rates or other incentives to the users participating in a group ride rental to encourage ridership of the electric transport devices.

Figure 7:
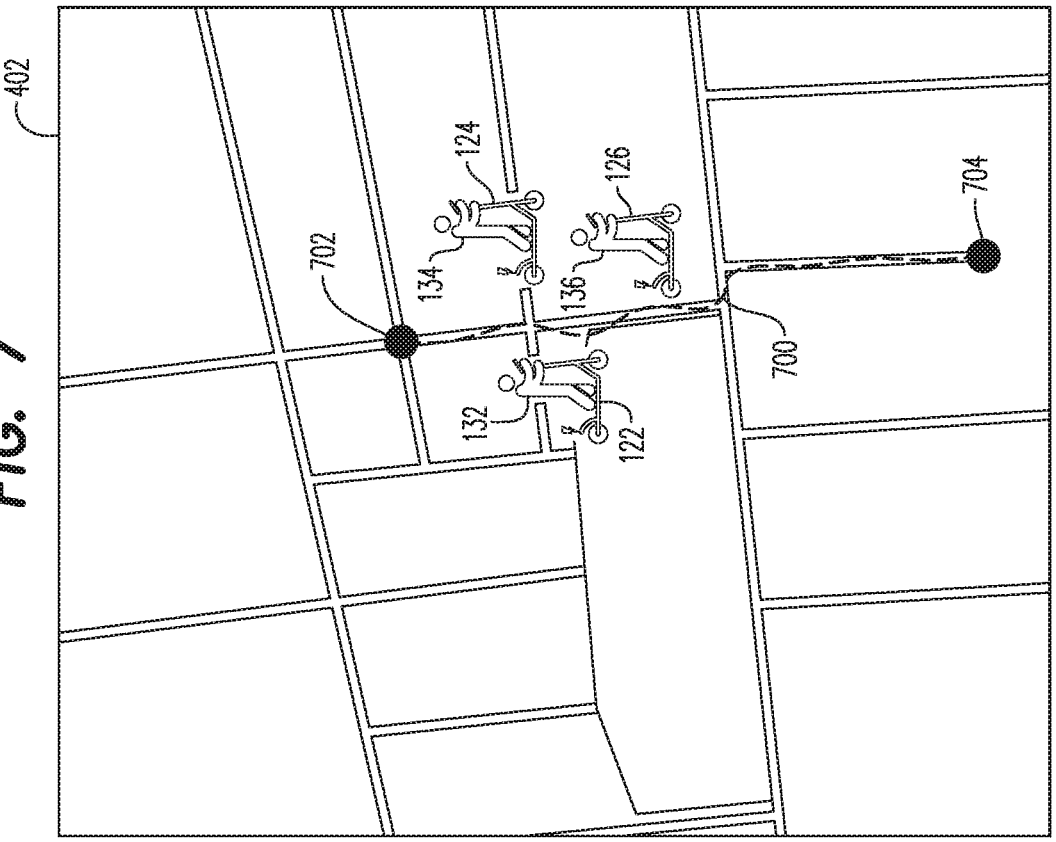
FIG. 7 is a schematic view of an example embodiment of a group ride rental to a destination in accordance with aspects of the present disclosure.

Referring now to FIG. 7, an example embodiment of a group ride 700 to a destination is shown. In this embodiment, each of the users participating in group ride 700 (e.g., first user 132, second user 134, and third user 136) has located and readied a respective electric transport device. For example, first user 132 is using first e-scooter 122, second user 134 is using second e-scooter 124, and third user 136 is using third e-scooter 126. At this point, synchronizing billing by service provider 110 for each user may begin for group ride 700. Additionally, at this point, service provider 110 may fully unlock or authorize each of the electric transport devices to be in a powered state to allow the electric motor to function according to normal operation.

In this embodiment, group ride 700 including first user 132, second user 134, and third user 136 begins at a first location 702 (i.e., the starting location for group ride 700) and ends at a second location 704 (i.e., the destination of the participants of group ride 700). According to the example embodiments, during group ride 700, each of the users may have billing for the rental of their respective electric transport devices synchronized by service provider 110 so that each user is paying approximately the same rates (e.g., based on distance and/or time, etc.) on group ride 700 from first location 702 to second location 704.

In some embodiments, group ride 700 may be a fixed route or trip to a common destination. In these embodiments, group ride 700 and, therefore, synchronized billing, may end once the users reach the common destination. In other embodiments, group ride 700 may last for an extended period of time and, therefore, continue synchronized billing, for as long as the participants in group ride 700 remain together in a group. In other words, the users participating in group ride 700 (e.g., first user 132, second user 134, and third user 136) may continue to receive the benefit of synchronized billing as long as their ride together continues.

Figure 8:
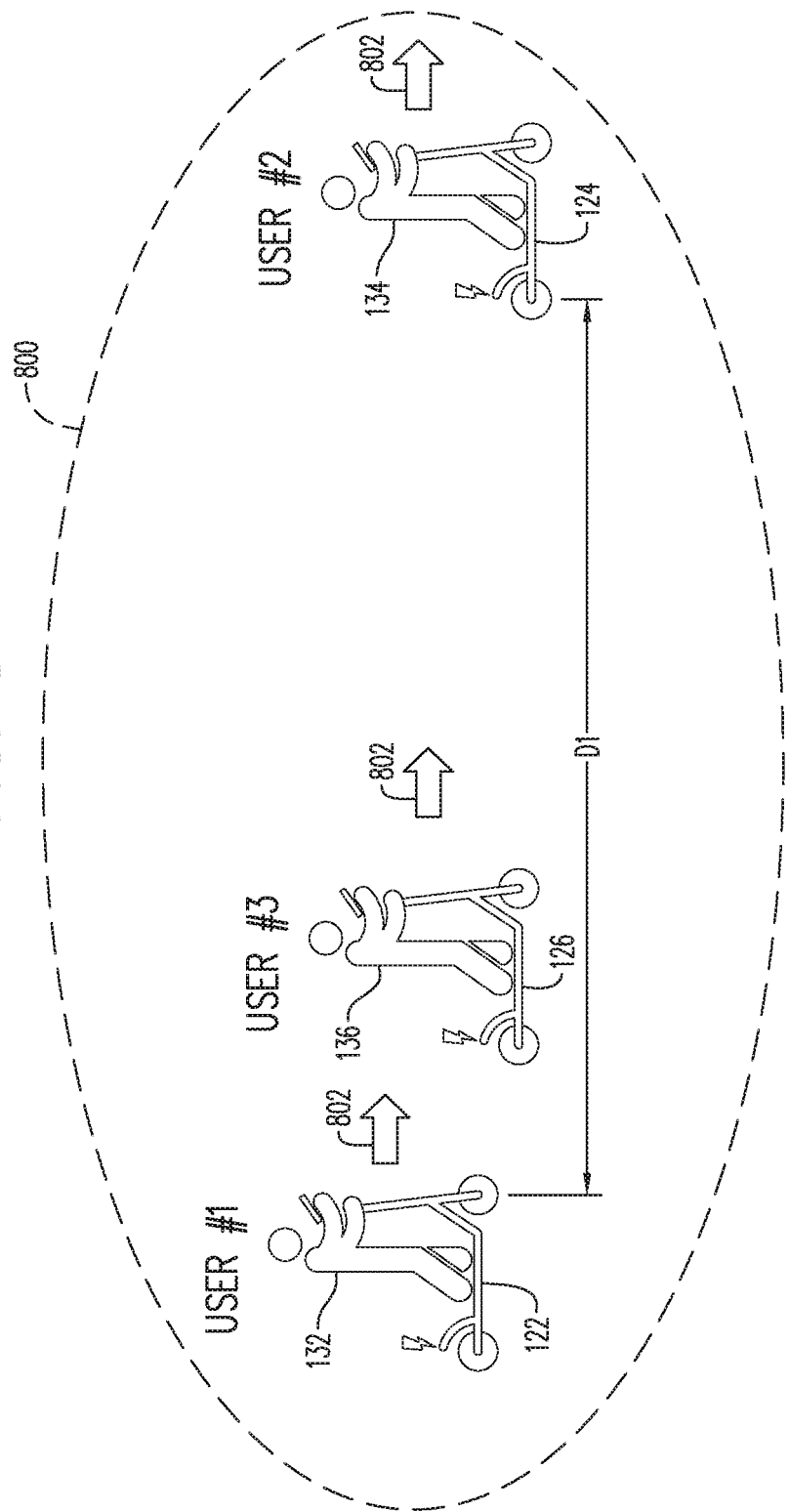
FIG. 8 is a representative view of an example embodiment of a travel envelope for a group ride rental in accordance with aspects of the present disclosure.

Referring now to FIG. 8, an example embodiment of a travel envelope 800 for a group ride rental, such as group ride 700, is shown. In some embodiments, the group ride rental with the associated synchronized billing may include travel envelope 800 surrounding the participants of the group ride. Travel envelope 800 may be a predetermined distance or radius between users participating in the group ride within which synchronized billing remains authorized by service provider 110. As shown in FIG. 8, travel envelope 800 may be defined as a first distance D1 between participants in group ride 700, for example, between first user 132 and second user 134.

In this embodiment, first distance D1 between first user 132 and second user 134 defining travel envelope 800 is between the users that are farthest apart from each other. In other embodiments, however, travel envelope 800 may be defined using other distances and/or criteria. For example, in some embodiments, travel envelope 800 may also take into account a direction and/or orientation of each user in the group ride. In this embodiment, each of first user 132, second user 134, and third user 136 are all traveling in approximately the same direction, a first direction 802. Additionally, in some embodiments, travel envelope 800 and/or first distance D1 may be proportional or related to a travel speed of users in the group ride to shorten or extend travel envelope 800.

Figure 9:
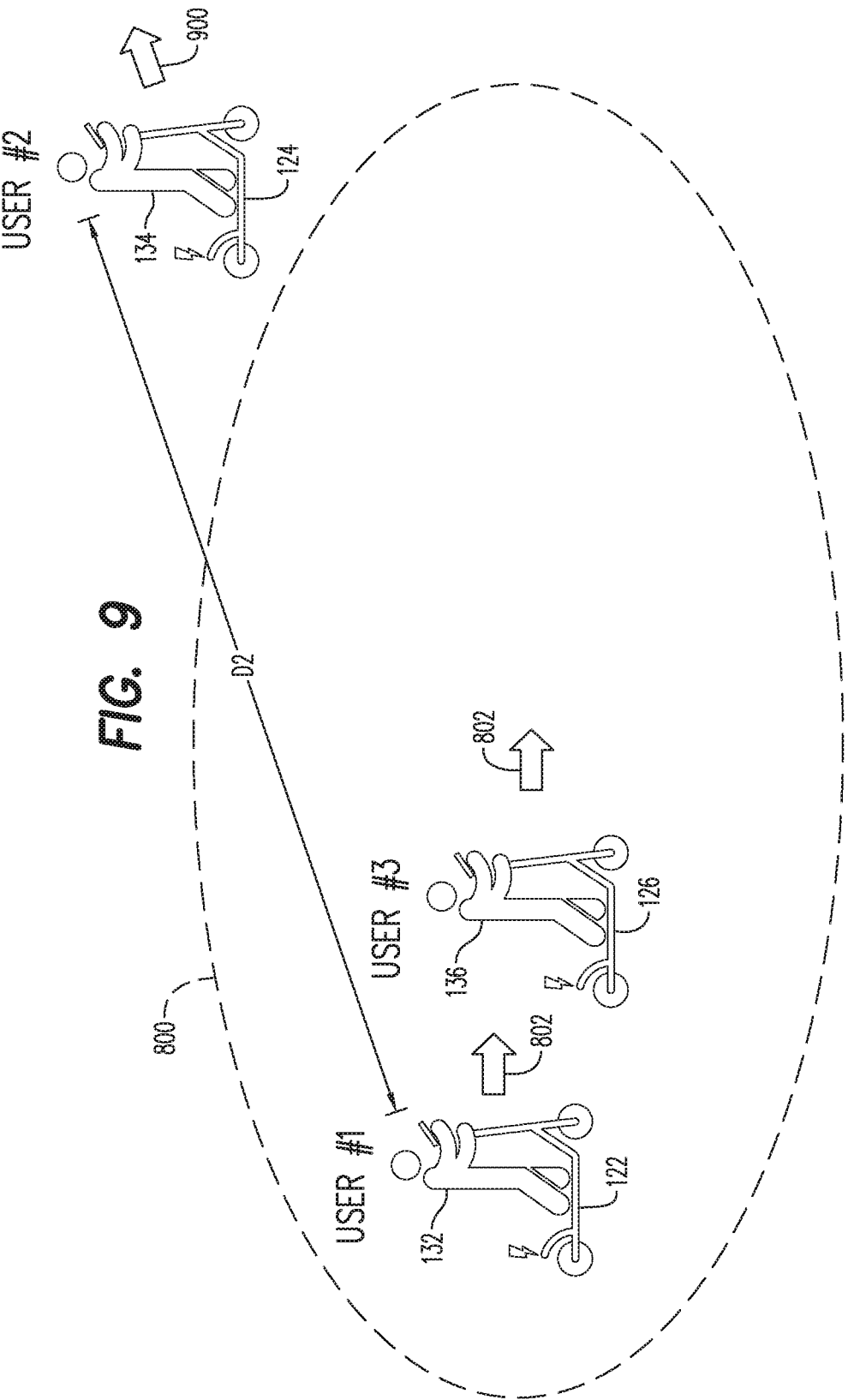
FIG. 9 is a representative view of an example embodiment of a user exiting a travel envelope for a group ride rental in accordance with aspects of the present disclosure.

As shown in FIG. 8, as long as each user participating in group ride 700 (e.g., first user 132, second user 134, and third user 136) remains within travel envelope 800, synchronized billing will be authorized by service provider 110. However, when a user leaves travel envelope 800 for the group ride, then service provider may end synchronized billing. Referring now to FIG. 9, a representative view of an example embodiment of a user exiting travel envelope 800 for a group ride rental, such as group ride 700, is shown.

In this embodiment, one of the users participating in group ride 700 (e.g., first user 132, second user 134, and third user 136) has exited travel envelope 800. For example, as shown in FIG. 9, second user 134 using second e-scooter 124 has traveled beyond travel envelope 800. In this scenario, second user 134 is now separated from first user 132 by a second distance D2 that is greater than first distance D1 defining travel envelope 800. Additionally, while first user 132 and third user 136 remain traveling approximately along first direction 802, second user 134 is now traveling in a different direction, for example, a second direction 900. Therefore, because second user 134 has left travel envelope 800, service provider 800 may end or terminate synchronized billing for group ride 700.

In some embodiments, once a user participating in the group ride rental has left or exited the travel envelope (e.g., travel envelope 800), service provider 110 may end synchronized billing for all users participating in the group ride. For example, in the scenario shown in FIG. 9, service provider 110 may end synchronized billing for group ride 700 for not only second user 134, but also for first user 132 and third user 136. Upon termination of synchronized billing, regular billing may continue for each user. Additionally, in the case of discounts or incentives applied by service provider for the group ride rental, such discounts or incentives may also be terminated upon completion of the group ride rental when a user exits the travel envelope.

In other embodiments, once a user participating in the group ride rental has left or exited the travel envelope (e.g., travel envelope 800), service provider 110 may end synchronized billing for the user leaving the group ride, but may continue to offer synchronized billing for the remaining users still participating in the group ride. For example, in the scenario shown in FIG. 9, service provider 110 may end synchronized billing for group ride 700 for second user 134, while first user 132 and third user 136 continue synchronized billing as long as they remain together within travel envelope 800.

Figure 10:
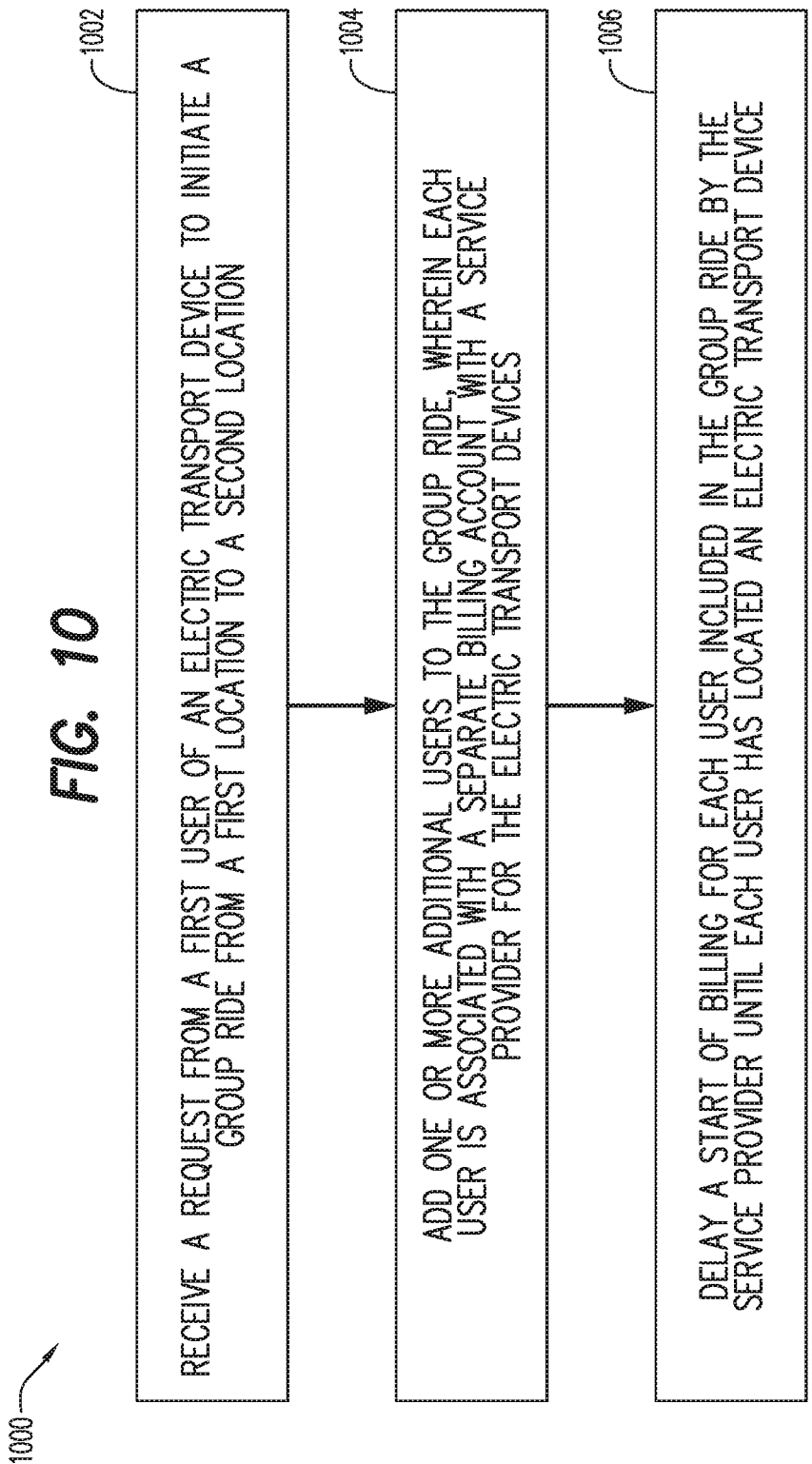
FIG. 10 is a flowchart of an exemplary method for synchronizing the start of group ride rentals of electric transport devices in accordance with aspects of the present disclosure.

FIG. 10 is a flowchart of a method 1000 for synchronizing the start of group ride rentals of electric transport devices according to an example embodiment. In some embodiments, method 1000 may be implemented by a computer or processor associated with an electric transport device service provider, for example, service provider 110, described above. In an example embodiment, method 1000 may begin with an operation 1002. At operation 1002, a request is received from a first user of an electric transport device to initiate a group ride from a first location to a second location. For example, at operation 1002, first user 132 may interact with service provider 110 using option 202 on user interface 200 to initiate group ride 700 from first location 702 to second location 704, described above.

Next, at an operation 1004, method 1000 includes adding one or more additional users to the group ride, where each user participating in the group ride is associated with a separate billing account with a service provider for the electric transport devices. For example, operation 1004 may include first user 132 (i.e., group leader 400) adding one or more additional users to the group ride, including second user 134 and/or third user 136. At operation 1004, first user 132 may add users through option 300 of user interface 200, including one or more of contacts 302, social media 304, telephone number 306 and/or NFC/Bluetooth® pairing 308. In this example, each of first user 132, second user 134, and third user 136 have a separate billing account with service provider 110 for billing purposes for the rental of their respective electric transport devices (e.g., e-scooters) during the group ride.

Method 1000 also includes an operation 1006. At operation 1006, a start of billing is delayed for each user included in the group ride by the service provider until each user has located an electric transport device. That is, at operation 1006, when one or more users participating in the group ride have not yet located and/or readied an electric transport device, such as shown in reference to scenario 600 of FIG. 6 above, billing for each user is delayed or postponed until all of the users are ready to travel. For example, as described above, in scenario 600, first user 132 and second user 134 have located and readied first e-scooter 122 and second e-scooter 124, respectively, while third user 136 has not yet located and readied third e-scooter 126. Accordingly, in this scenario, billing for the group ride rental is delayed for first user 132 and second user 134 until third user 136 has obtained third e-scooter 126 and is ready to go on the group ride. With this arrangement, synchronized billing for each user of the group rental may be provided.

While the electric transport device illustrated and described in reference to the exemplary embodiments is as an electric scooter, any type of small, personal electric transport vehicle could be employed, including, but not limited to an electric skateboard, one- and two-wheeled self-balancing boards, electric bicycles or e-bikes, electric-assisted mopeds, small electric-powered mobility transporters, or any other type of personal transportation device, as described above.

While various embodiments of the disclosure have been described, the description is intended to be exemplary, rather than limiting and it will be apparent to those of ordinary skill in the art that many more embodiments and implementations are possible that are within the scope of the disclosure. Accordingly, the disclosure is not to be restricted except in light of the attached claims and their equivalents. Also, various modifications and changes may be made within the scope of the attached claims.

The invention claimed is:

1. A method for initiating a group ride for a plurality of users of electric transport devices, the method comprising:
   receiving, at a user interface of a service provider for the electric transport devices, a request from a user interface of a mobile device associated with a first user of a first electric transport device to initiate a group ride from a first location to a second location;
   adding, through the user interface of the mobile device associated with the first user, additional users to the group ride, wherein each user of the additional users is associated with a mobile device in communication with the user interface of the service provider, and wherein each user of the additional users has a separate billing account with the service provider for the electric transport devices from the first user;
   delaying a start of billing for each user of the additional users included in the group ride by the service provider until each user of the additional users has located a respective electric transport device;
   unlocking, by a processing device of the service provider, each electric transport device associated with a user of the additional users included in the group ride from a locked state to a partially unlocked state until remaining users of the additional users included in the group ride have finished locating their respective electric transport devices;
   wherein, in the partially unlocked state, the electric transport device is authorized for manual operation but is not provided with power.

2. The method according to claim 1, wherein adding the additional users includes adding users from at least one of contacts, social media, a telephone number, or short-range communication pairing associated with the mobile device of the first user.

3. The method according to claim 1, wherein billing for the group ride is terminated upon reaching the second location.

4. The method according to claim 1, further comprising:
   defining a travel envelope for the group ride, wherein the travel envelope is determined based on a predetermined distance between the plurality of users;
   and wherein billing for the group ride is synchronized while each user included in the group ride remains within the travel envelope.

5. The method according to claim 4, wherein billing for the group ride is terminated when at least one user included in the group ride exits the travel envelope.

6. The method according to claim 4, wherein billing for the group ride is terminated for each user included in the group ride that exits the travel envelope;
   and wherein billing for the group ride remains synchronized for each user included in the group ride that remains within the travel envelope.

7. The method according to claim 1, further comprising providing a predetermined time limit for users included in the group ride to locate their respective electric transport device.

8. The method according to claim 1, further comprising indicating a location of one or more electric transport devices within a predetermined area of the first user on the user interface of the mobile device associated with the first user.

9. A method for synchronizing billing for a group ride for a plurality of users of electric transport devices, the method comprising:
   receiving, at a user interface of a service provider for the electric transport devices, a request to initiate the group ride of the electric transport devices from a first location to a second location, the group ride including the plurality of users, wherein each user of the plurality of users is associated with a mobile device in communication with the user interface of the service provider, and wherein each user of the plurality of users has a separate billing account with the service provider for the electric transport devices;
   delaying a start of billing for each user of the plurality of users included in the group ride by the service provider until each user of the plurality of users has located a respective electric transport device;
   unlocking, by a processing device of the service provider, each electric transport device associated with a user of the plurality of users included in the group ride from a locked state to a partially unlocked state until remaining users of the plurality of users included in the group ride have finished locating their respective electric transport devices;
   wherein, in the partially unlocked state, the electric transport device is authorized for manual operation but is not provided with power;
   and synchronizing billing for each user of the plurality of users included in the group ride during the group ride from the first location to the second location.

10. The method according to claim 9, wherein in the locked state, wheels of each electric transport device are prohibited from movement.

11. The method according to claim 10, wherein, in the partially unlocked state, the wheels of each electric transport device are permitted free motion, but an electric motor of the electric transport device is not provided with power.

12. The method according to claim 9, further comprising:
authorizing, by the service provider, each respective electric transport device associated with the plurality of users included in the group ride for powered operation by an electric motor of the respective electric transport device once each user of the plurality of users included in the group ride has located their respective electric transport device.

13. The method according to claim 9, further comprising providing a discounted rental rate to each user of the plurality of users included in the group ride by the service provider.

14. The method according to claim 9, further comprising:
defining a travel envelope for the group ride, wherein the travel envelope is determined based on a predetermined distance between the plurality of users;
and wherein billing for the group ride is synchronized while each user included in the group ride remains within the travel envelope.

15. The method according to claim 14, wherein billing for the group ride is terminated when at least one user included in the group ride exits the travel envelope.

16. A system for synchronizing billing for a group ride for a plurality of users of electric transport devices, comprising:
a plurality of electric transport devices;
a service provider for the plurality of electric transport devices, the service provider including a user interface;
and a plurality of user interfaces associated with mobile devices of the plurality of users, wherein the mobile devices of each user are in communication with the user interface of the service provider, and wherein each user of the plurality of users has a separate billing account with the service provider for the electric transport devices;
and wherein the service provider includes at least one processor configured to execute instructions to:
receive, through the user interface, a request to initiate a group ride of electric transport devices from a first location to a second location, the group ride including at least two users of the plurality of users;
delay a start of billing for each user of the plurality of users included in the group ride until each user of the plurality of users has located a respective electric transport device;
unlock, by a processing device of the service provider, each electric transport device associated with a user of the plurality of users included in the group ride from a locked state to a partially unlocked state until remaining users of the plurality of users included in the group ride have finished locating their respective electric transport devices;
and synchronize billing for each user of the plurality of users included in the group ride during the group ride from the first location to the second location.

17. The system according to claim 16, wherein the plurality of users interact with the user interface of the service provider through an application on the mobile device associated with the user.

18. The system according to claim 16, wherein the service provider is configured to authorize each respective electric transport device associated with the plurality of users included in the group ride for powered operation by an electric motor of the respective electric transport device once each user of the plurality of users included in the group ride has located their respective electric transport device.

19. The system according to claim 18, wherein, in the partially unlocked state, wheels of each electric transport device are permitted free motion, but the electric motor of the electric transport device is not provided with power.

20. The system according to claim 16, wherein the service provider is configured to terminate billing for the group ride upon the users reaching the second location.

* * * * *